(12) United States Patent
Kemmet et al.

(10) Patent No.: US 12,269,333 B2
(45) Date of Patent: Apr. 8, 2025

(54) TRAILER FRAME RAIL SUSPENSION FOR ELECTRIC AND HYBRID TRANSPORT

(71) Applicant: eNow Systems LLC, Warwick, RI (US)

(72) Inventors: Ryan Kennedy Kemmet, Phoenix, AZ (US); Jeffrey C. Flath, Warwick, RI (US); Robert W. Doane, Harwich, MA (US)

(73) Assignee: ENOW SYSTEMS LLC, Warwick, RI (US)

( * ) Notice: Subject to any disclaimer, the term of this patent is extended or adjusted under 35 U.S.C. 154(b) by 457 days.

(21) Appl. No.: 17/685,758

(22) Filed: Mar. 3, 2022

(65) Prior Publication Data

US 2022/0281307 A1    Sep. 8, 2022

Related U.S. Application Data

(60) Provisional application No. 63/193,708, filed on May 27, 2021, provisional application No. 63/155,962, filed on Mar. 3, 2021.

(51) Int. Cl.
| | |
|---|---|
| *B60K 1/04* | (2019.01) |
| *B60G 1/02* | (2006.01) |
| *B60H 1/00* | (2006.01) |
| *B62D 21/20* | (2006.01) |

(52) U.S. Cl.
CPC ............ *B60K 1/04* (2013.01); *B60G 1/02* (2013.01); *B60H 1/00278* (2013.01); *B62D 21/20* (2013.01); *B60K 2001/0444* (2013.01)

(58) Field of Classification Search
CPC .... B60K 1/04; B60K 1/00; B60K 2001/0444; B60K 2001/0405; B62D 21/20; B62D 21/18; B62D 21/00; B62D 59/04; B62D 59/00; B60P 3/20; B60P 3/00; B60H 1/00278; B60H 1/00; B60H 1/00271; B60G 1/00; B60G 1/02; B60G 5/00; B60G 2300/02; B60G 2300/04; B60G 2300/042; B60G 2300/50
See application file for complete search history.

(56) References Cited

U.S. PATENT DOCUMENTS

| | | | | |
|---|---|---|---|---|
| 5,314,201 A | * | 5/1994 | Wessels | B62D 53/068 180/209 |
| 6,260,645 B1 | * | 7/2001 | Pawlowski | B60G 11/04 322/3 |
| 7,147,070 B2 | * | 12/2006 | Leclerc | B60K 1/04 180/65.25 |

(Continued)

*Primary Examiner* — James M Dolak
(74) *Attorney, Agent, or Firm* — Pauley Erickson & Swanson

(57) ABSTRACT

A self contained battery and slide frame houses a pair of trailer axles and an electrical vehicle storage battery secured by parallel slide frame rails adapted for attachment to an underside of a standard tractor trailer (Class 8) trailer frame. The slide frame attaches to an underside of a trailer using perforated frame beams used to vary a position of the wheel/axle assemblies relative to the trailer body and payload. The slide frame rails provide self contained support for a storage battery, e-axle, control electronics and connecting wires for charging and running a vehicle load from the storage battery. Vehicle loads powered by the storage battery include transport refrigeration units (TRUs) and electrical vehicle (EV) tractors.

10 Claims, 10 Drawing Sheets

(56) References Cited

U.S. PATENT DOCUMENTS

| | | | | |
|---|---|---|---|---|
| 7,241,146 B1* | 7/2007 | Kim | ................... | B60R 16/0207 |
| | | | | 439/4 |
| 8,056,329 B2* | 11/2011 | LaRose | ................ | B60P 1/4471 |
| | | | | 290/1 A |
| 8,801,013 B2* | 8/2014 | Ramsey | ................ | B62D 21/11 |
| | | | | 280/124.11 |
| 9,878,682 B2* | 1/2018 | Pierce | .................... | H02J 7/342 |
| 10,549,647 B2* | 2/2020 | Healy | .................... | B60L 50/50 |
| 10,807,427 B2* | 10/2020 | Lin | ...................... | B60G 5/005 |
| 10,821,853 B2* | 11/2020 | Healy | .................. | B60W 20/12 |
| 11,117,439 B2* | 9/2021 | Abram | .................... | B60K 1/02 |
| 11,117,629 B1* | 9/2021 | Wessels | .............. | B62D 53/068 |
| 11,325,453 B2* | 5/2022 | Friedman | ........... | H01M 50/249 |
| 11,362,379 B2* | 6/2022 | Saroka | ............. | H01M 10/6565 |
| 11,926,207 B2* | 3/2024 | McKibben | .............. | B60L 58/21 |

\* cited by examiner

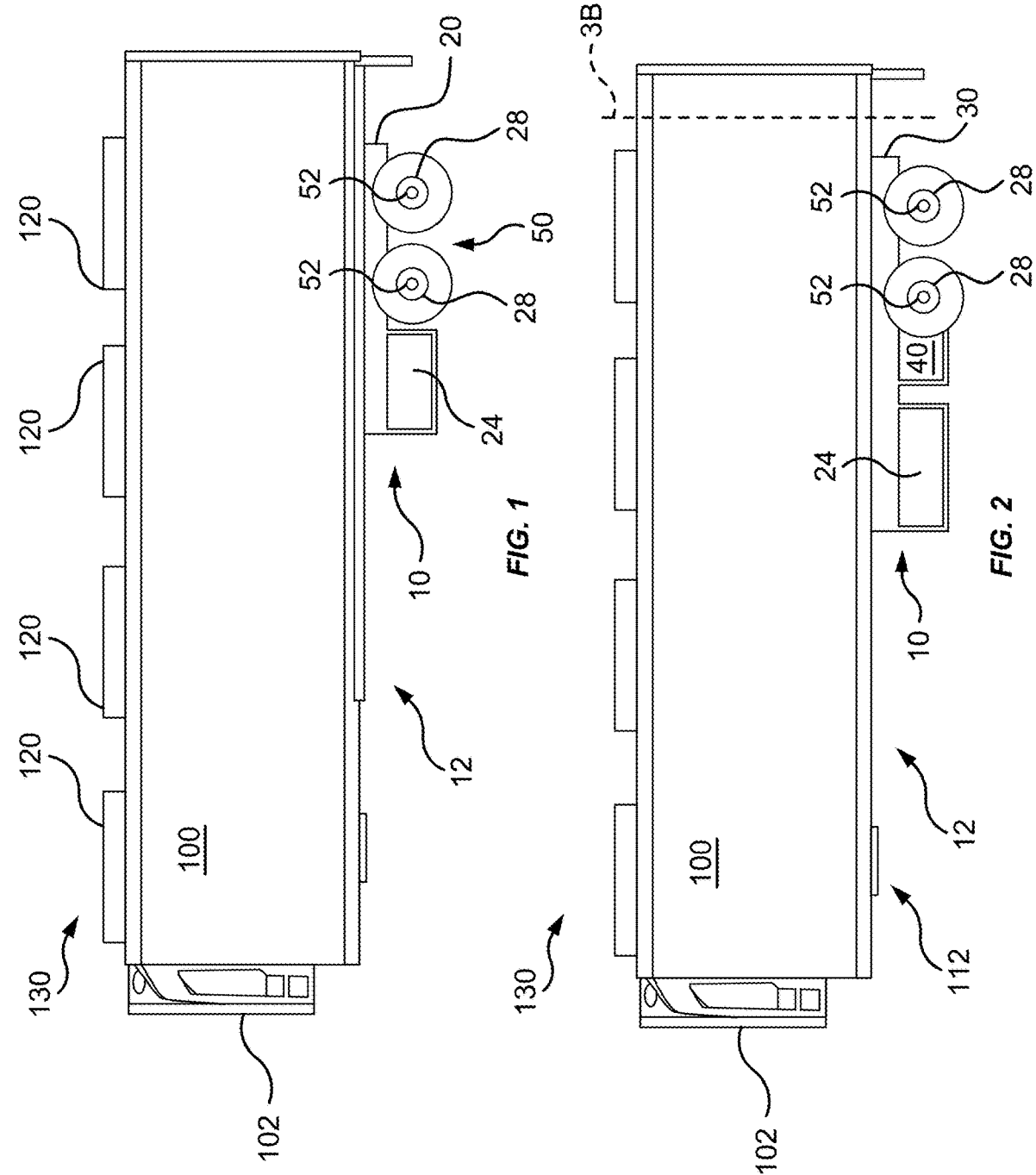

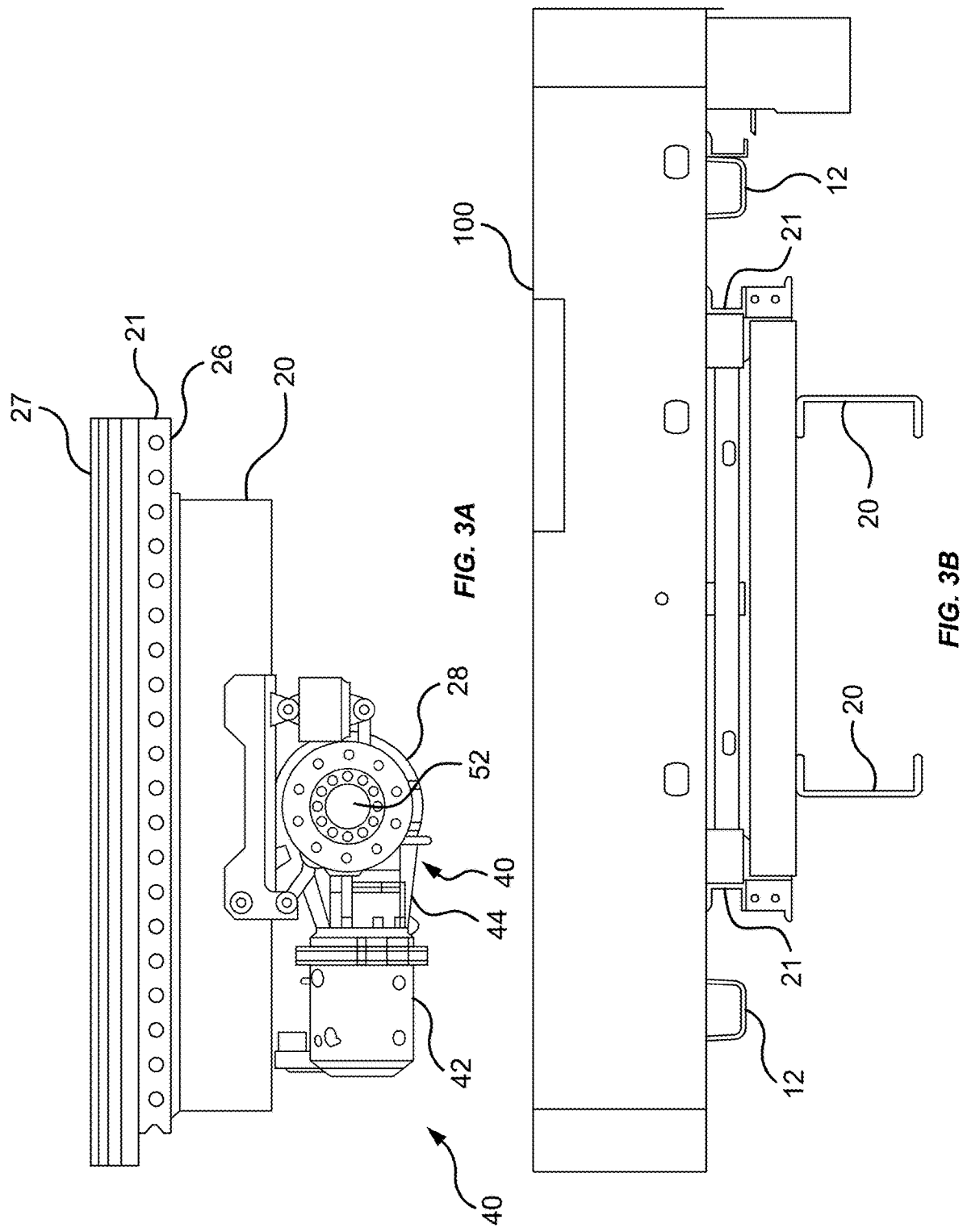

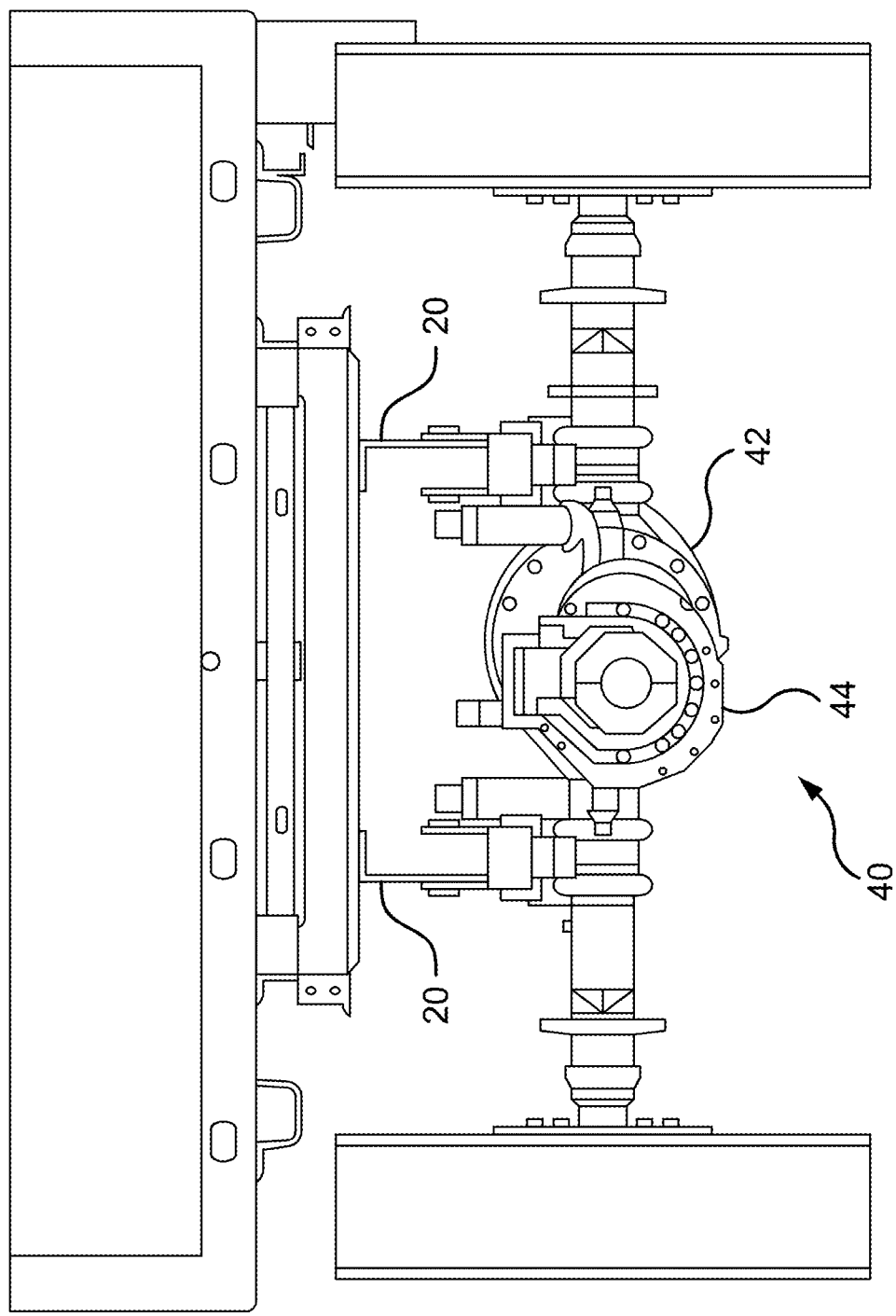

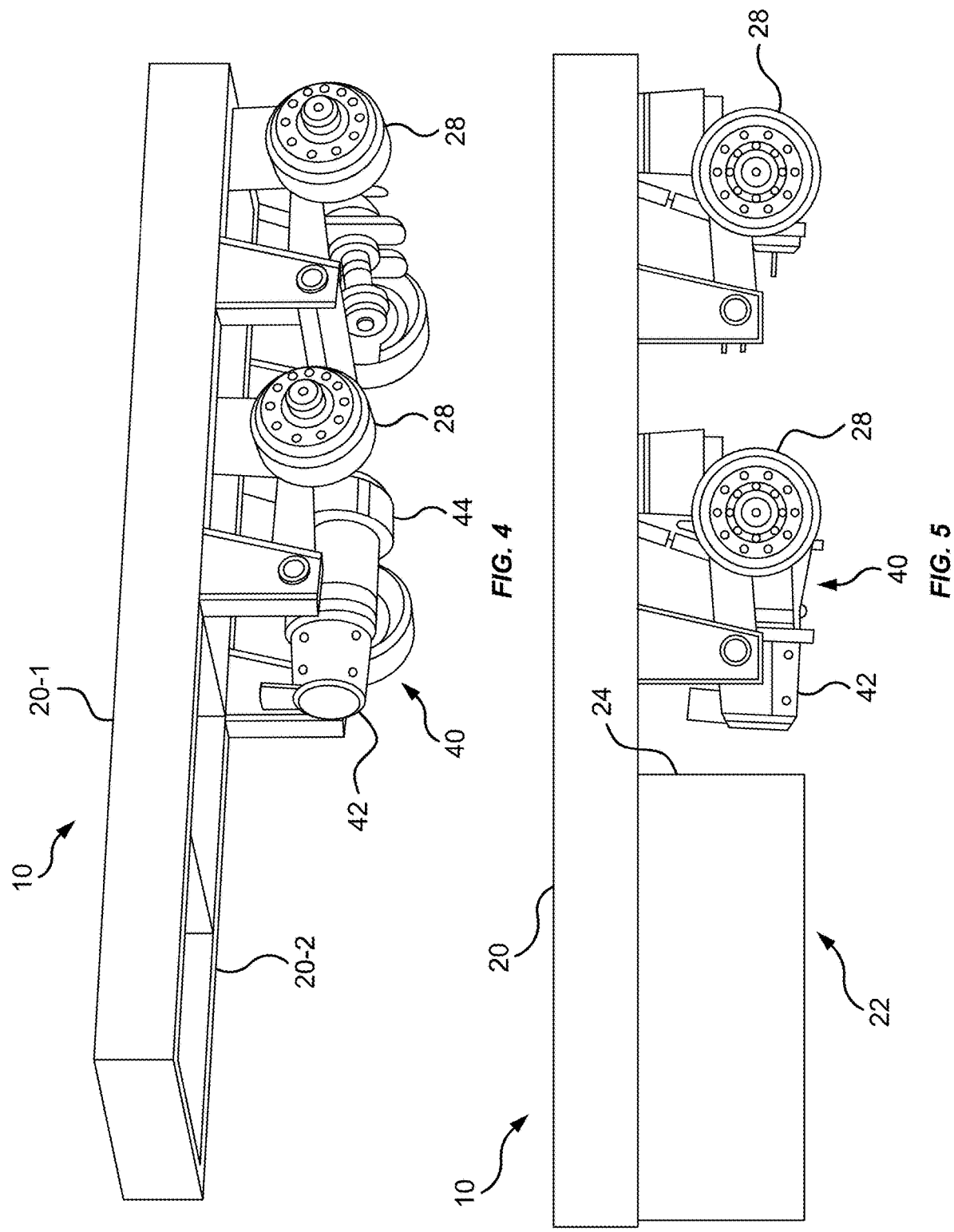

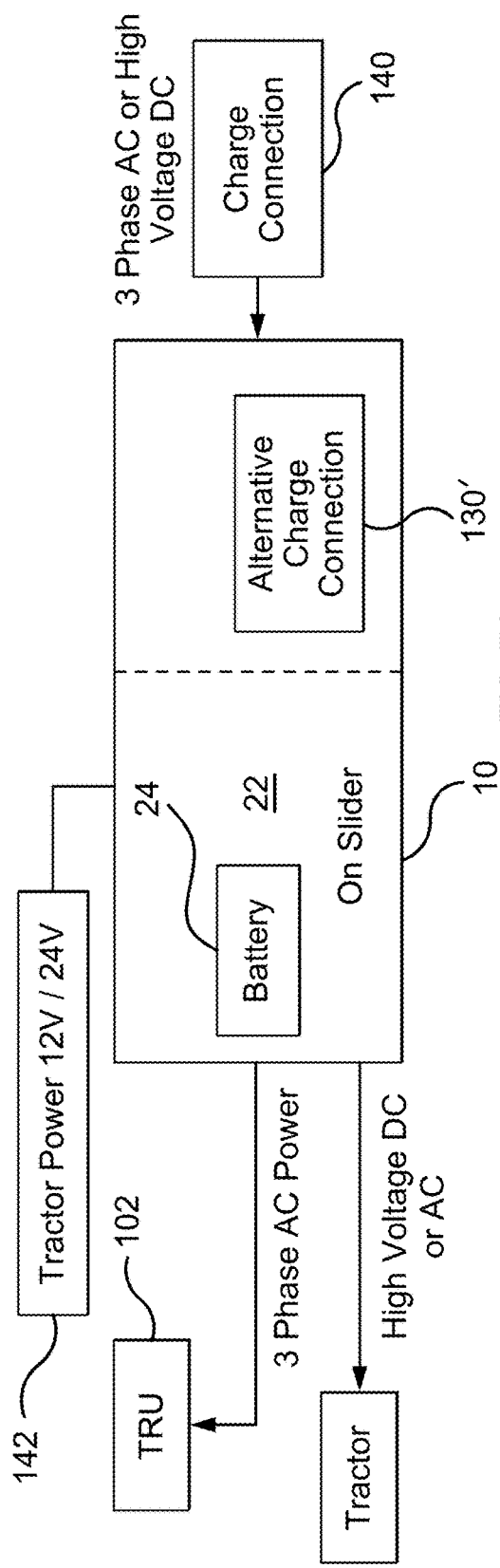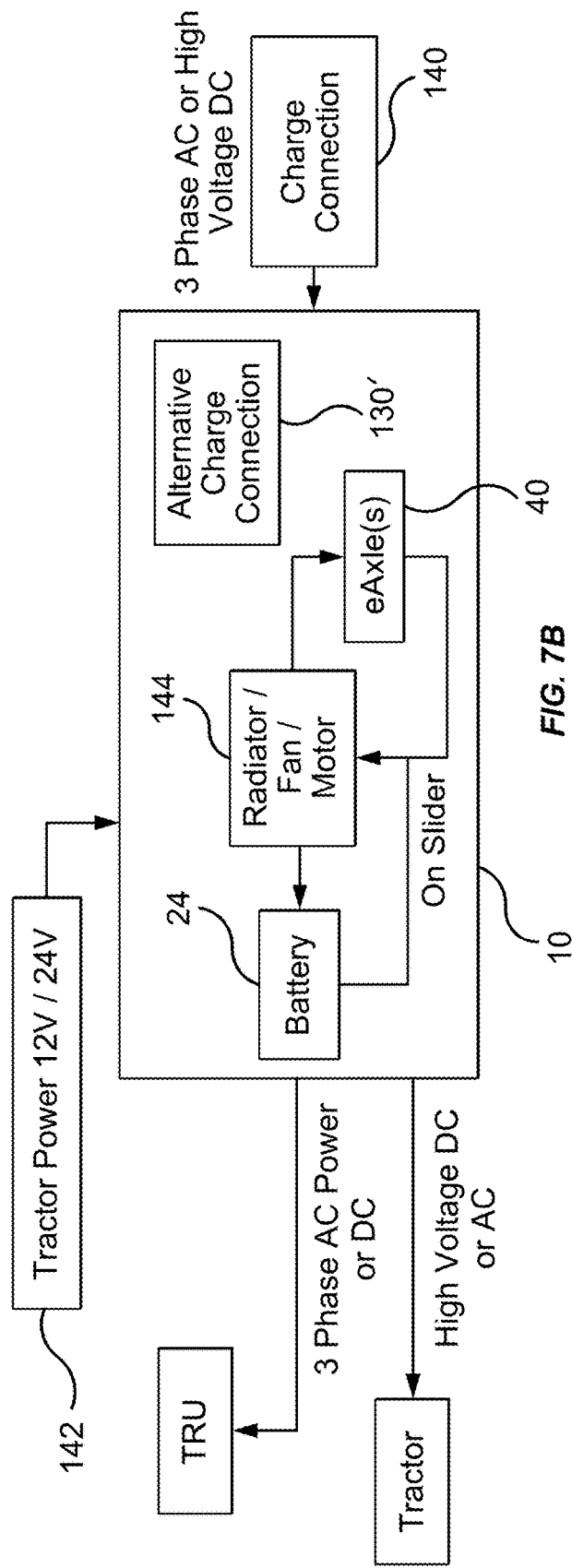

TRAILER FRAME RAIL SUSPENSION FOR ELECTRIC AND HYBRID TRANSPORT

RELATED APPLICATIONS

This patent application claims the benefit under 35 U.S.C. § 119(e) of U.S. Provisional Patent Application No. 63/155,962, filed Mar. 3, 2021, entitled "TRAILER FRAME RAIL SUSPENSION FOR ELECTRIC AND HYBRID TRANSPORT," and U.S. Provisional Patent Application No. 63/193,708, filed May 27, 2021, both incorporated herein by reference in entirety

BACKGROUND

Modern battery technology has provided electric vehicles that rival the performance of gasoline and diesel counterparts, and tractor trailer (Class 8 trucks) are no exception. Tractor trailer trucks are commonly visible on interstate highways for transport of various goods and commodities. While conventional trailers are often passive, drawing needed electric power for lights from the corresponding tractor, electric refrigeration units may be employed on the trailers for transport of perishable and frozen goods. Other powered components may include liftgates or other suitable accessories. Mobile electric loads need to be sourced from a rechargeable battery that is typically connected to an external power source when idle or parked. A physical cable and plug arrangement engages with a suitable socket on a charger enabled trailer bay or parking arrangement for charging the battery during vehicle downtime.

SUMMARY

A self contained battery and slide frame houses a pair of trailer axles and an electrical vehicle storage battery secured by parallel slide frame rails adapted for attachment to a standard tractor trailer (Class 8) trailer frame. The slide frame attaches to an underside of a trailer using perforated frame beams used to vary a position of the wheel/axle assemblies relative to the trailer body and payload. The slide frame rails provide self contained support for a storage battery, e-axle, control electronics and connecting wires for charging and running a vehicle load from the storage battery. Vehicle loads powered by the storage battery include transport refrigeration units (TRUs) and electrical vehicle (EV) tractors, however any suitable electrical load may be supported, such as liftgates and cab comfort loads. The fully supported and self contained apparatus locates the storage battery, transport axles and e-axles in close proximity for alleviating the trailer frame from the substantial weight of the battery, since the weight of both the trailer payload and the storage battery are transferred to the axles and road surface via the slide frame rails and do not pass or load the trailer frame.

In contrast to electric passenger vehicles (cars), where batteries are designed into and supported by the native vehicle frame, conventional trailers have no such provision. Trailers are generally considered passive vehicles, towed by a tractor, and need only accommodate the weight of a payload carried in the trailer. The advent of electric trucks, however, has broadened the options for trailer usage. Solar panels may be mounted on the roof of a trailer. Refrigeration units, conventionally powered by fossil fuels, may be operated on stored electrical energy. Since trailers are often interchanged with various tractor vehicles, it is burdensome to interconnect the energy systems of both, as this places constraints on deployment. It is therefore beneficial to design a trailer vehicle as a standalone configuration. Unfortunately, however, conventional trailer designs may not anticipate the weight of an electric storage battery. Accordingly, configurations herein substantially overcome these shortcomings by providing a slide frame as a standalone suspension apparatus that retrofits to an existing trailer and bears the weight of the trailer, payload, storage battery, and associated control electronics.

In a tractor-trailer vehicle arrangement having a trailer with an articulation coupling at a forward end and a plurality of wheels on respective axles at a rearward end, the trailer employs longitudinal frame members for engagement with a wheeled suspension. The suspension is provided by slide frame undercarriage device including a pair of elongated parallel rails having a spacing based on an alignment with the longitudinal frame members on an underside of the trailer, thereby providing ample bearing support for the trailer load and electrical storage devices. A suspension assembly is adapted to receive one or more axle assemblies, where each axle assembly has opposed wheels adapted for road transport. A typical trailer has two axles, each with double wheels at each end. An attachment between the elongated parallel rails and the suspension assembly transfers a load from the trailer to the axle assemblies. In contrast to conventional approaches that engage only the native trailer longitudinal frame members, the approach herein extends the rails of the slide frame for supporting a containment area suspended from a forward extension of the elongated parallel rails on a forward side of the suspension assembly. The containment area is therefore adapted to receive and support an electrical storage device disposed across a width of the elongated parallel rails and connected to a vehicle based load, along with other controls and support systems of the refrigerated transport vehicle.

BRIEF DESCRIPTION OF THE DRAWINGS

The foregoing and other objects, features and advantages of the invention will be apparent from the following description of particular embodiments of the invention, as illustrated in the accompanying drawings in which like reference characters refer to the same parts throughout the different views. The drawings are not necessarily to scale, emphasis instead being placed upon illustrating the principles of the invention.

FIG. 1 is a context view of a TRU (Transport Refrigeration Unit) powered by a slide frame mounted electrical storage device (battery) as disclosed herein;

FIG. 2 is a context view of a TRU (Transport Refrigeration Unit) powered by a shied frame mounted electrical storage device (battery) and a wheel-driven generator (e-axle) source, as disclosed herein;

FIG. 3A shows a side view of the e-axle of FIG. 2;

FIG. 3B shows an end view of the slide frame of FIG. 3A from the view shown in FIG. 2;

FIG. 3C shows the e-axle of FIG. 3A attached to the slide frame of FIG. 3B;

FIG. 4 shows a side perspective of a slide frame mounted suspension suitable for use with the configurations of FIGS. 1-3C;

FIG. 5 shows a side view of the slide frame of FIG. 4;

FIGS. 7A and 7B show block diagrams of the electrical connections on the slide frame configurations of FIGS. 4-6B;

DETAILED DESCRIPTION

Figure 6A:
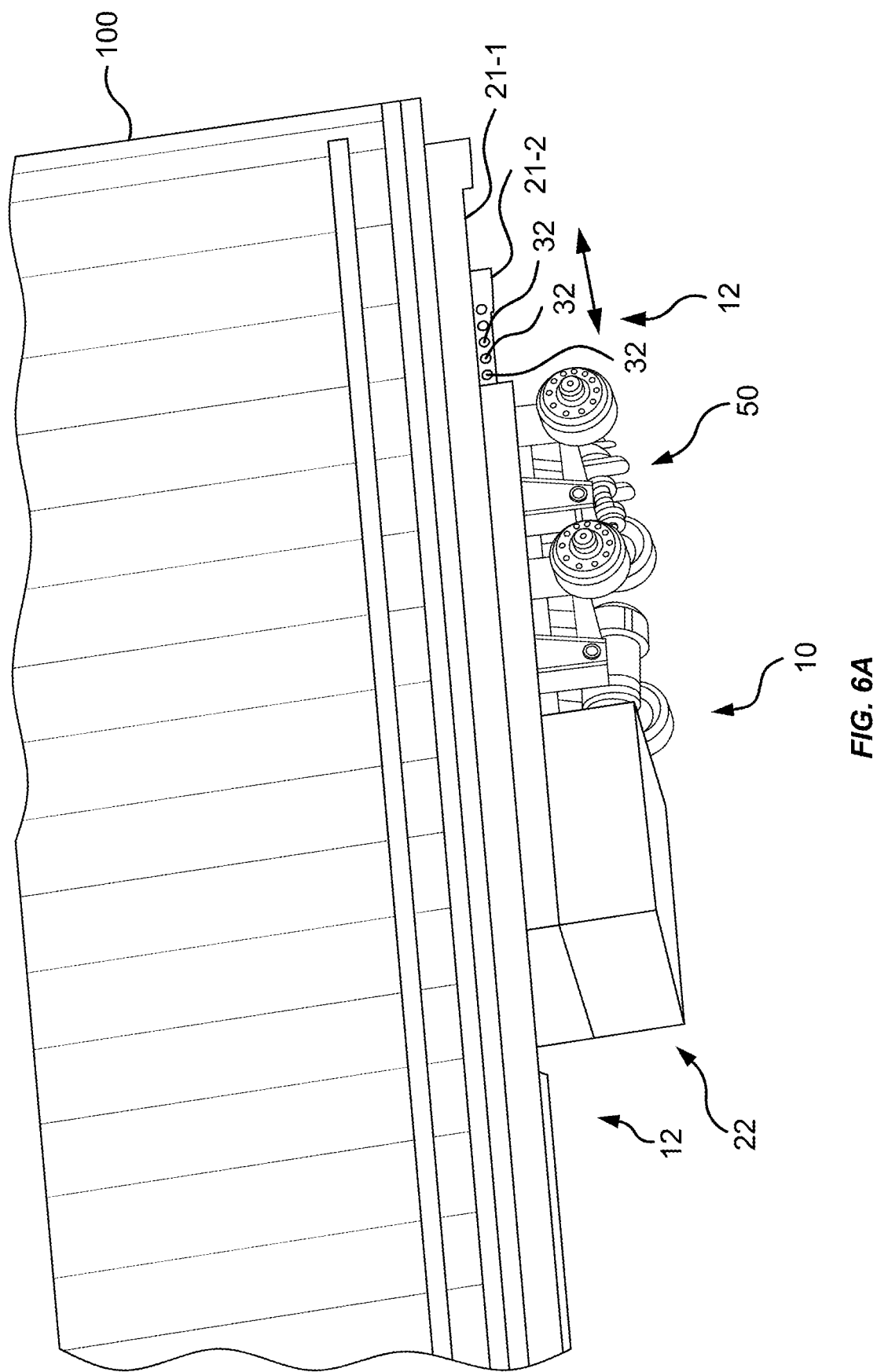
FIGS. 6A and 6B show slidable movement of the slide frame along the trailer undercarriage.

Configurations presented below show examples of a refrigerated trailer vehicle with the slide frame device for electrical storage devices and related components. In the description that below, the following definitions are employed:

Transport Refrigeration Unit (TRU): a refrigeration apparatus for maintaining a cooling temperature in the enclosed trailer volume, generally for consumable food items such as fresh (refrigerated) cargo and frozen stock. TRUs as disclosed herein operate on electrical power using an arrangement of motor driven compressors and heat exchangers.

Electrical Storage Device: a battery for storing and releasing electrical energy for powering vehicle loads such as a TRU and motive power to the tractor in hybrid arrangements. The electrical storage device differs from the starting battery used in an internal combustion engine by having a greater size and energy storage capacity. Various battery chemistries are available, however lithium ion batteries are often employed due to a high capacity for storage and current delivery.

Trailer—a passive articulated portion of a transport truck adapted for cargo storage and external motive transport by a tractor vehicle for propulsion.

Tractor—a propulsion vehicle having a hitch or "5$^{th}$ wheel" for articulated attachment to one or more trailer vehicles. The tractors may be powered by an internal combustion (IC) engine, electric motors, or a hybrid combination. Often referred to as class-8 trucks, various arrangements of articulated vehicles with different wheel/axle combinations are operable with configurations herein.

Vehicle Load—A vehicle load generally refers to an electrical consumption by the tractor/trailer articulated combination, including high drain loads such as the TRU and motive propulsion power from electrical drive sources. Starting of an IC engine by a starter motor is usually reserved for the 12V/24V vehicle native starting and charging system.

Source—a source of electrical energy, for either storage in the electrical storage device or powering a load; note that the electrical storage device can itself act as a source for powering a load. Solar panels, external AC connections (shore power), e-axles and also excess current from the native vehicle alternator may all be invoked as sources.

FIG. 1 is a context view of a TRU (Transport Refrigeration Unit) powered by a slide frame mounted electrical storage device (battery) as disclosed herein in combination with roof mounted solar panels on the trailer. Configurations herein include TRU and solar panel controls and electrical sources such as those disclosed in U.S. Pat. No. 10,710,725, filed Jan. 30, 2018, entitled "MULTIPLE VEHICULAR CHARGE SOURCES AND LOADS," incorporated herein by reference in entirety. Referring to FIG. 1, in a transport trailer vehicle 100 for refrigerated storage, a vehicle slide frame device 10 for enhancing solar and motive power capabilities includes a pair of elongated slide frame rails 20 in a parallel arrangement with a spacing based on alignment with structural support on an underside 112 of the trailer. This allows the suspension 50 to mate with existing trailer designs. A suspension assembly 50 is adapted to receive one or more axle assemblies 52, one of which is an e-axle, such that each axle assembly has opposed wheels 28 adapted for road transport, typically a pair of double wheels as seen on conventional "18 wheeler" trucks. FIG. 2 shows a context view of a TRU (Transport Refrigeration Unit) powered by a slide frame mounted electrical storage device (battery) and a wheel-driven generator (e-axle) source, as disclosed herein. The trailer 100 also includes a plurality of solar panels 120 arranged as a bank 130 of solar panels for an alternate charge connection to the electrical storage device, discussed further below.

The electrical storage device is an array of battery cells, typically of a Li ion chemistry. Configurations may have many variants, but an expected range of operation is supported by about 350 VDC nominal (medium voltage) and 700 VDC nominal (high voltage), with a total of 40 kWhr to 100 kWhr approximate battery sizes. The TRU runs on AC modulated by an inverter to produce the 120/240 VAC and/or 3 phase/277 VAC expected by the TRU. The array is aggregated from the ~3.6V nominal lithium cells with typically 35-100 amp hours each (depending on cylindrical or pouch implementations. This implies about 90+ cells in series and several of the series strings in parallel based on the energy storage required (43 kWhr in 3 parallel banks for 36 amp hour cells). The weights of these battery packs with an NMC (nickel, manganese, cobalt) battery chemistry weigh from 400 lbs. to 1,100 lbs., hence the need for the slide frame device 10 to mitigate this load.

FIG. 3A shows a side view of the e-axle of FIG. 2, and FIG. 3B shows an end view of the slide frame of FIG. 3A from the view shown in FIG. 2. The full suspension 50 attaches to the elongated rails 20 using crossmembers, braces and welds joins the elongated parallel rails and the suspension assembly, such that the attachment 49 provides a full suspension 50 for transferring a trailer load from the trailer to the axle 52 assemblies. The suspension device is beneficial when the axle assembly includes a generator 42 and a differential 44 defining the e-axle 40 for motive generation of electrical energy from rotation of the wheels. An e-axle 40 is designed for mounting on a tractor frame, in the same manner as axles 52, which have a different, narrower spacing than the trailer structure.

FIG. 3C shows the e-axle of FIG. 3A attached to the slide frame of FIG. 3B. The parallel frame rails 20-1 . . . 20-2 (20 generally) have a spacing based on an industry standard for a trailer vehicle, and the suspension assembly is based on an industry standard for a tractor vehicle frame, and therefore allows use of axle assemblies 52 adapted for engagement with the suspension assembly. The slide frame 10 device therefore adapts the tractor frame structure expected by the e-axle for mounting on a trailer frame.

The slide frame device also provides for attachment of batteries and associated control and support circuitry, such as inverters, converters and other electrical devices. Battery storage is a function of volume, and battery charge material tends to be rather dense. The slide frame device 10 therefore extends the elongated parallel rails for forming and supporting a containment area 22 on the underside of the trailer 100 and forward of the axle 52 and e-axle 40 assemblies. The slide frame 10 is adapted for receiving an electrical storage element 24 connected to the generator 42 and for housing a control circuit, in which the generator is responsive to the control circuit (controller 150).

The concise and efficient packaging of the e-axle, batteries, control circuits and electrical elements, such as associated transformers and chargers provides for consistent installation on trailers. The controls also include a power interface to a reefer compressor adapted for thermal regulation of an interior of the trailer (either refrigeration or freezer capability). A charging interface and connection is also made to the bank 130 of solar panels on a roof of the trailer.

At least one of the axle assemblies 52 and 40 is adapted for rearward sliding communication along the underside of the trailer, for retaining accommodation of a load concentrated on the rear trailer lip, as when a forklift or other heavy equipment is invoked to facilitate loading and unloading. This also provides for balancing loads to spread weight among the axles and tractor.

FIG. 4 shows a side perspective of a slide frame mounted suspension suitable for use with the configurations of FIGS. 1-3C, and FIG. 5 shows a side view of the slide frame of FIG. 4. In the particular configuration, shown in FIGS. 4 and 5 the slide frame device 10 for a trailer vehicle, includes a pair of elongated frame rails 20-1 ... 20-2 (20 generally) adapted to engage with a trailer vehicle frame 12 having a plurality of engagement positions for receiving a suspension undercarriage assembly. The containment area 22 is suspended from the elongated rails 20 and supports the electrical storage device 24, and a locking apparatus 26 is for securing the elongated rails at one of the engagement positions of the plurality of engagement positions, defined by a row of perforations 21. Slide frame rails generally employ a protrusion as a locking apparatus 26. The ability of the slide frame 10 to engage the perforated slide frame allows compatibility with various trailers.

The elongated rails 20 and slide frame 10 are adapted to engage perforated frame beams 21-1 ... 21-2 (21 generally) on an underside of the trailer 100, such that the perforated frame beams 21 are configured to support the trailer 30 and payload therein. The locking mechanism 26 includes a protrusion 27 disposed for engaging perforations 32 in the perforated frame for attaching the elongated rails at a number of positions by inserting the protrusions 27 into an interference fit with the perforations 32. The disclosed locking mechanism is adapted to dispose the protrusions in and out of engagement with the perforated beam for disposing the elongated rails at any position of the plurality of positions. Other suitable locking mechanisms may be employed as the elongated rails 20 align adjacent to the perforated frame beams 21 which are common on tractor vehicles. Sliding configurations of trailer wheels allow repositioning to accommodate load positioning and facilitating unloaded by supporting a forklift entering from the rear.

A cooling system is in fluidic connection with the battery, such that the cooling system is contained withing the containment area and rails, and is adapted for circulation of a cooling medium for thermal exchange with the storage battery. High powered and/or high discharge batteries, such as lithium-ion batteries, typically generate heat and may be liquid cooled to maintain proper operating temperatures. In colder extremes, the same thermal medium may also be employed to for heating to maintain optimal operating conditions.

The apparatus operates as a fully contained tractor axle and support system, further including at least one axle having opposed wheels adapted for highway usage, wherein the pair of elongated rails is adapted to attach to and bear a trailer payload weight during highway transport. Typically, two or three axles are employed on class-8 trailers, each having dual tire/wheel assemblies at each end, providing a total of 12 tires and wheels supporting the trailer in a 3 axle configuration.

Figure 6B:
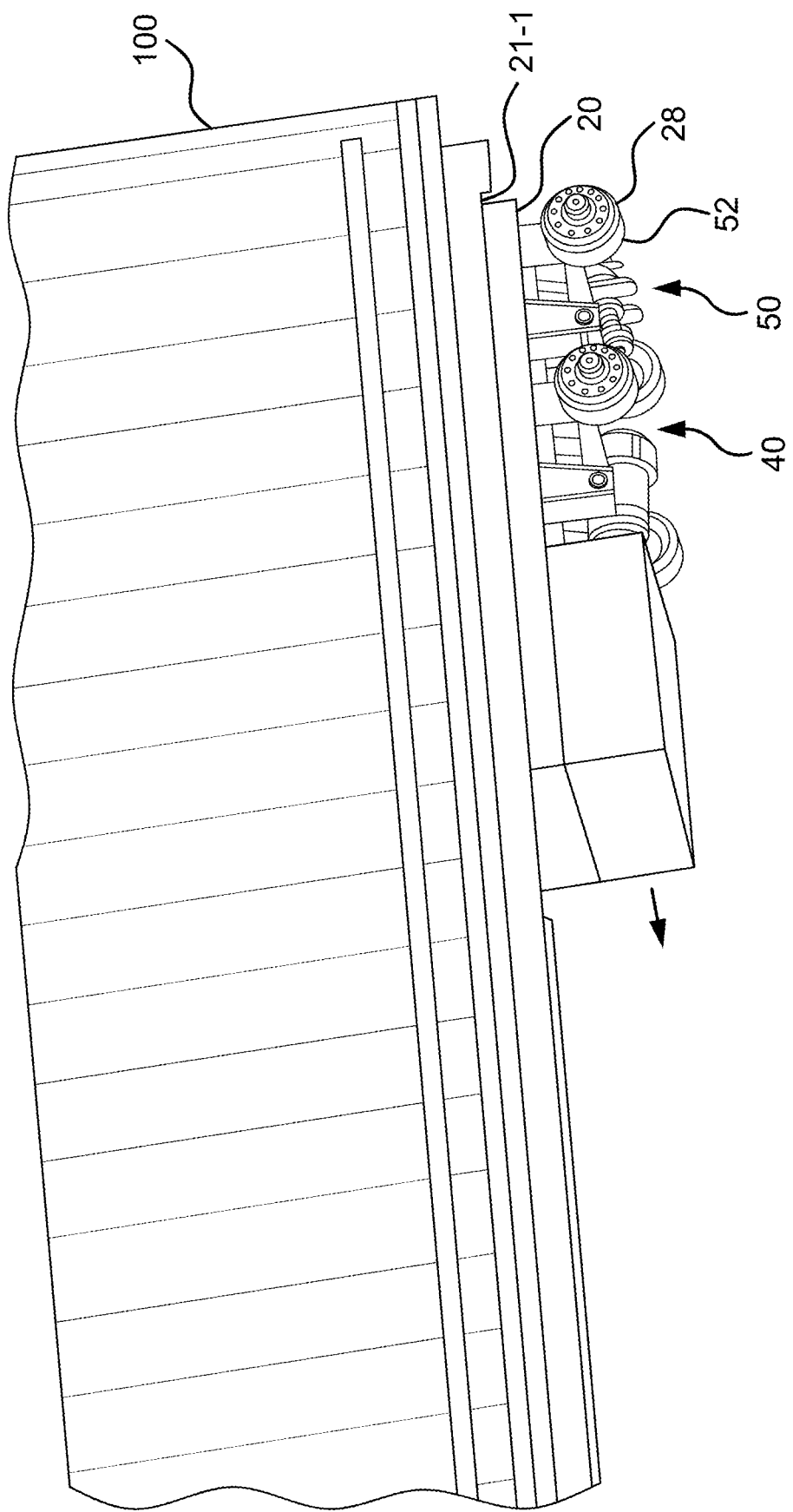

FIGS. 6A and 6B show slidable movement of the slide frame along the trailer undercarriage. In order to integrate with preexisting trailers and allow retrofit operation, the elongated rails and battery occupy available space just forward of the trailer axles. Since some trailers are designed for three axles, along with sliding space for movement of the axle assembly, a substantial void may be provided in front of the wheels. A typical trailer may provide frame beams of 102" or 120" for accommodating a number of wheels with sufficient slide tolerance. Accordingly, the containment area and battery occupy a region adjacent to two axles supporting the trailer, the battery disposed in a region reserved for a third axle, effectively using the space already open for the optional third axle. FIGS. 6A and 6B show a range of movement of the apparatus from a forward position to a rearmost position, such that any of the intermediate perforations define the plurality of available positions.

FIGS. 7A and 7B show block diagrams of the electrical connections on the slide frame configurations of FIGS. 4-6B. The slide frame device 10 may be configured with a variety of trailers and tractor combinations, each with respective electrical sources and loads. In FIG. 7A, the slide frame device 10 includes the electrical storage device 24 in the containment area 22, roughly referring to the extended portion of the slide frame rails 20 that extend forward of a length needed for the suspension and axles. An alternate charge connection 130' includes the bank of solar panels 130 or other suitable source. A charge connection 140 is provided by an external plug-in source, usually from the electric grid and offered as a standard fixture at most truck bays for 120/240 VAC 1 or 3 phase power, often called shore power. Tractor power 142 may be provided by the native vehicle alternator to the extent is it available and not needed for native vehicle loads (starting, fuel pumps, headlights, running lights, etc.). The TRU cools the insulated conditioned space inside the trailer 100. In a hybrid or EV (Electric Vehicle) tractor, the tractor is also a load powered by the electric storage device 24. Electrical switching and flow as shown in FIGS. 7A-7B is performed by a controller 150, as depicted in the patent cited above and shown in FIG. 8.

When the e-axle 40 is provided, it also provides a charging source for the electric storage device 24 and also invokes a cooling system 144, which may be shared with the electric storage device 24 to offset heat generated from high current discharge.

Figure 8:
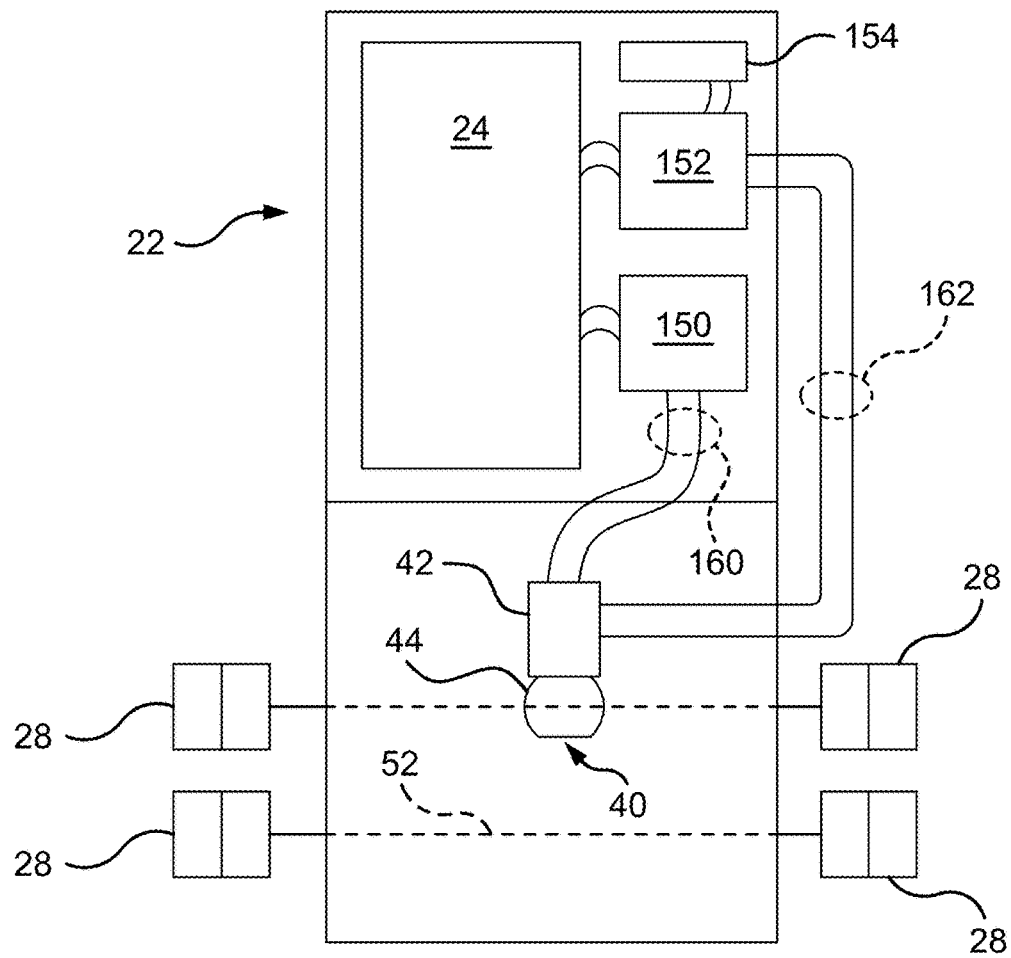
FIG. 8 shows a schematic of the slide frame and included elements as in FIGS. 1-7B.

FIG. 8 shows a schematic of the slide frame and included elements as in FIGS. 1-7B. High capacity storage batteries such as the electric storage device 24 contain substantial quantities of dense charge materials, and accordingly, the elongated frame rails 20 are configured to support the combined weight of the battery, the trailer and a payload contained in the trailer during transport at highway speeds. The encapsulation of the elements with the elongated rails 20 provides that a weight load of the battery is transferred to the axles via the pair of elongated rails 20 independently of the frame 12 of the trailer. The result is a modular slide frame device 10 that can be engaged with a standard slide frame on a trailer. This allows any suitable trailer to be employed—it need not be designed to anticipate the weight of the storage battery.

In a particular configuration, at least one of the axles is an e-axle (electrical axle) configured for momentum generation of electrical energy, such that the storage battery is connected to the e-axle for receiving the generated electrical energy. Such e-axles include a generator 42 driven by a differential 44 rotationally coupled to the wheels 28 for receiving rotational momentum.

Other elements in the containment area 22 include a controller 150 for electrical switching and transformation, a cooling system 152 for cooling the battery and e-axle 40, and a heat exchanger 154 such as a fan driven radiator for venting heat from cooling fluid circulated by the cooling system. Power lines 160 conduct generated power from the generator 42 to the electric storage device 24 via the controller 150, and cooling lines 162 carry cooling fluid between the generator 42, electrical storage device 24 and radiator 154.

In the e-axle configuration, the cooling system 152 is in fluidic communication with the e-axle for thermal exchange with the generator 42 mechanically coupled to the wheels 28 for receiving rotational momentum for driving the generator. The battery and the e-axle share common cooling fluid for thermal exchange, thus needing only a single cooling fluid and radiator circuit.

As the axles 28, 40 slide on the trailer frame beams, a distance to components on the containment area 22 may change. Accordingly, an electrical cable interface is configured to restrain electrical cables connecting the electric storage device to trailer fixtures. One or more solar panels 120 on the roof of the trailer 100 may also electrically connect to the electrical storage device. In a reefer configuration, the TRU 102 also electrically connects to the electrical storage device 24.

The electrical storage device 24 generally invokes a cooling medium. In the case where the axle assembly includes a generator and a differential for motive generation of electrical energy resulting from rotation of the wheels, the cooling system 152 provides a fluidic coupling that carries coolant between the cooling system, the electrical storage device 24 and the generator 33, and includes a pump in fluidic communication with the fluidic coupling for generating a coolant flow in the fluidic coupling. The heat exchanger 154 then cools the cooling medium via ambient air exchange.

Figure 9A:
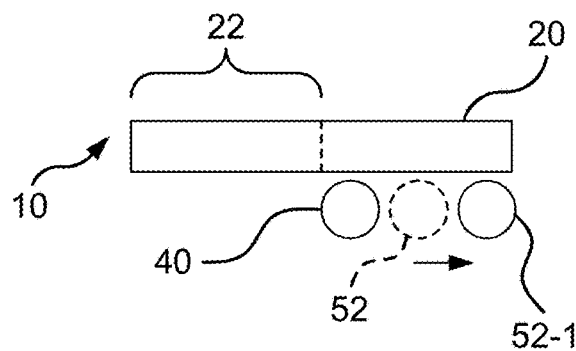
FIGS. 9A-9B show an alternate arrangement of the axle movement of FIG. 6A.
Figure 9B:
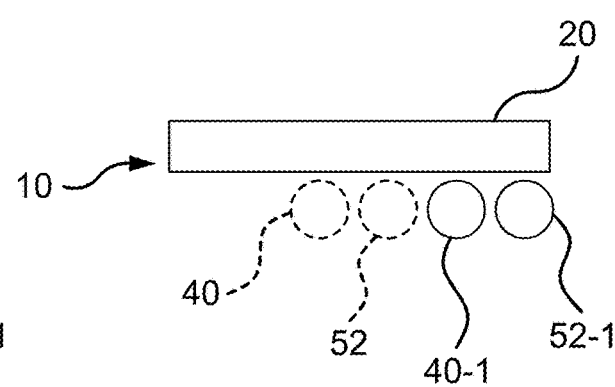

FIGS. 9A-9B show an alternate arrangement of the axle movement of FIG. 6A. A particular configuration includes a two axle suspension, where many trailers can accommodate 3 axles. Further, the perforated frame beams 21 of the trailer accommodates travel of the suspension along the trailer frame 12. The slide rail frame 10 provides elongated parallel rails 20 to extend forward of the axle assembly for suspending the containment area 22 in the volume configured for accommodation of an additional axle assembly. The slide frame 10 leverages this additional volume to provide additional support and volume for a heavy electrical storage, using (in part) volume reserved for a third axle. Slidable axles are still provided by a plurality of axle assembles, such that each axle assembly of the plurality of axle assemblies attached to a respective suspension assembly, as in FIGS. 4 and 5. Each suspension assembly is separate from the suspension assembly of other axle 40 assemblies. Therefore, a rearward axle assembly is independently slidable separate from the others of the plurality of axle assemblies. Referring to FIGS. 4, 5 and 9, the slide frame 10 provides the containment area 22 in an area unused by a third axle assembly 28'. Sliding axle operation, however, is preserved by separate suspension assemblies that allow either axle 52, 40 to move rearward. In FIG. 9A, the axle is disposed rearwards to position 52-1, while e-axle 40 remains. Alternatively, in FIG. 9B, both the axle 52 and e-axle 40 slide rearward 52-1, 40-1, and the flexibility and length of power lines 160 and cooling lines 162 accommodates the shift.

Figure 10:
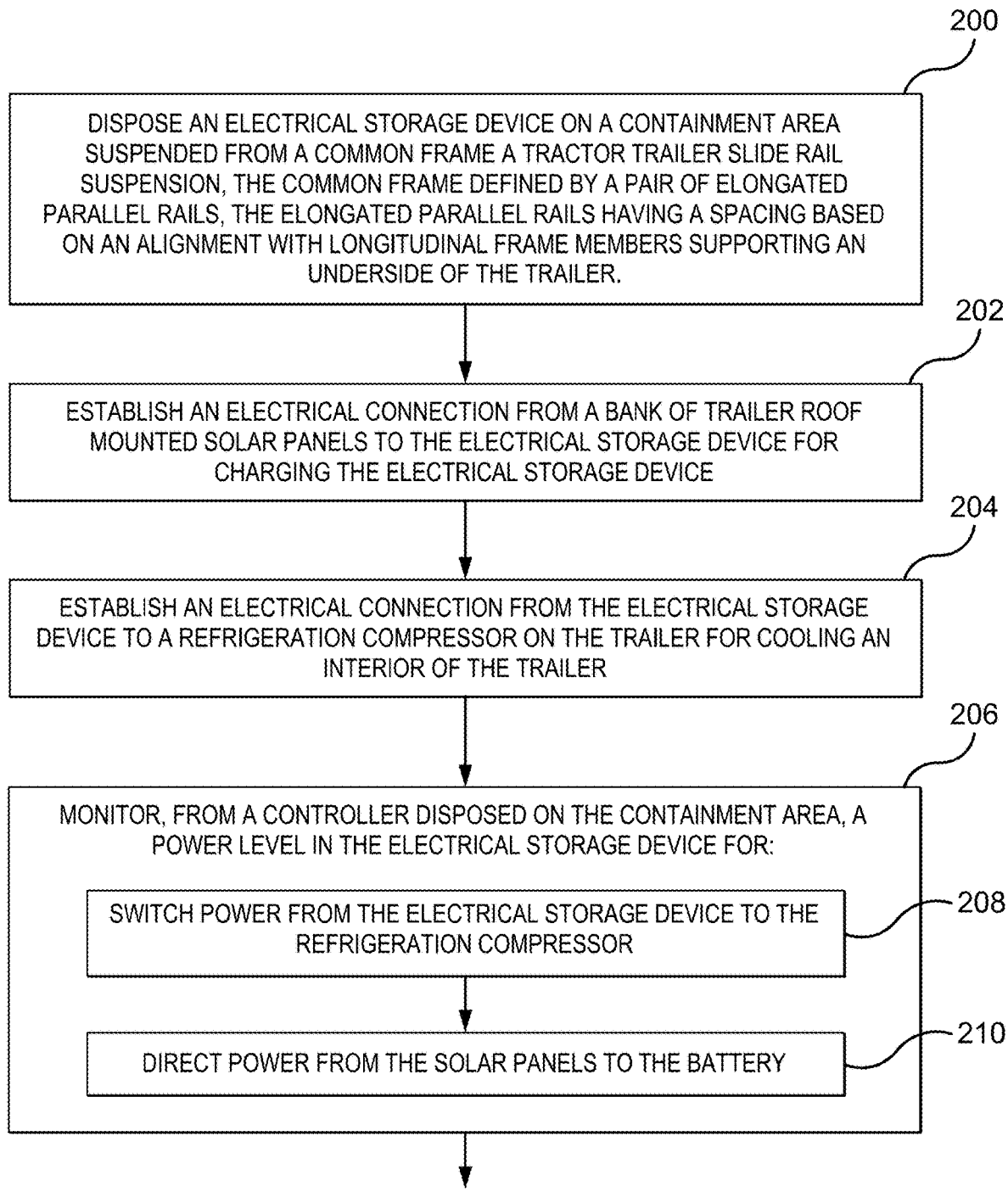
FIG. 10 is a flowchart of electrical flow control in the configurations of FIGS. 1-9B.
Figure 10:
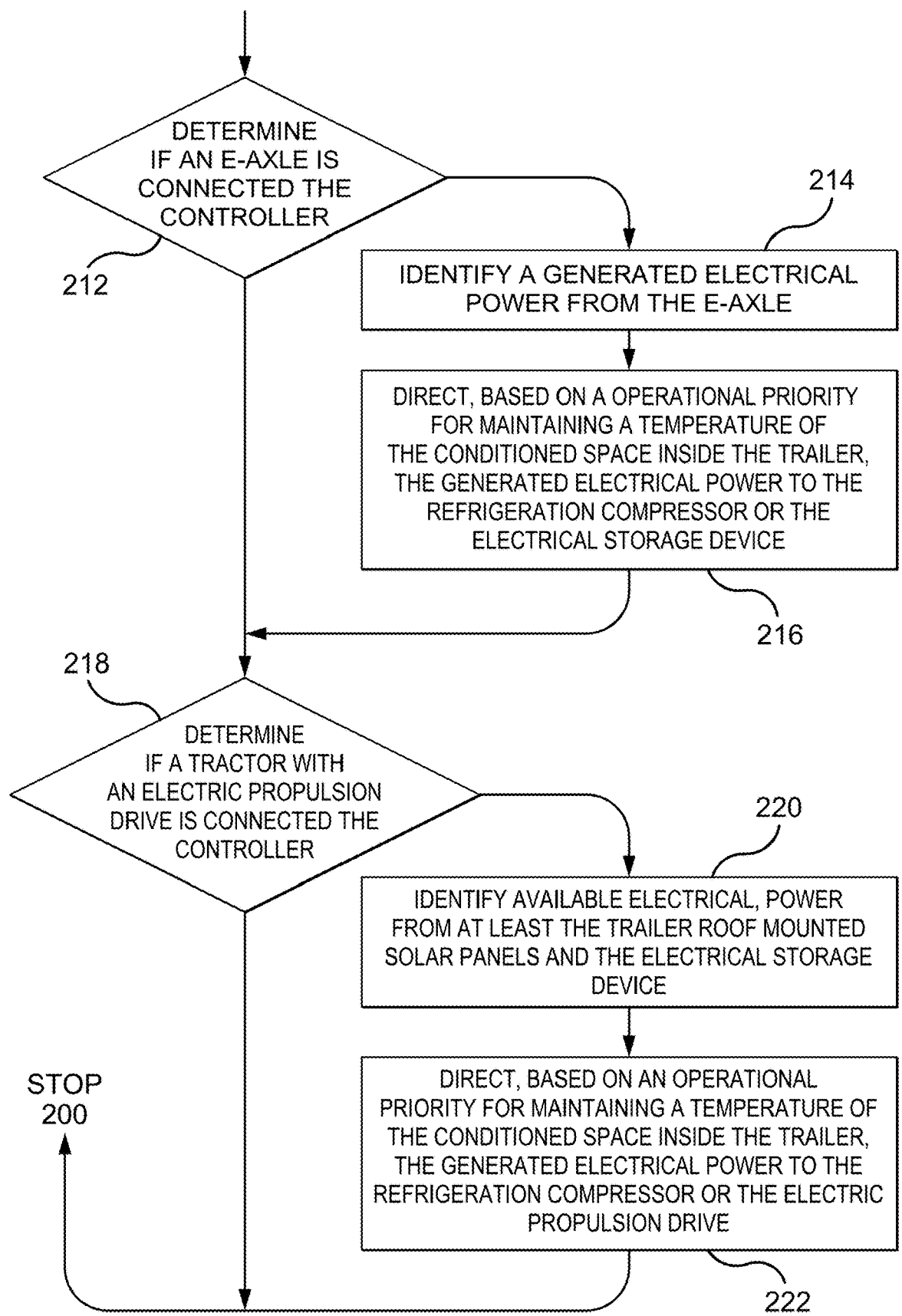

FIG. 10 is a flowchart of electrical flow control in the configurations of FIGS. 1-9B. The containment area 22 includes a platform or horizontal planar support for the controller 150, cooling system 152 and heat exchanger 154, or radiator, in addition to the electrical storage device 24 and associated cabling and tubing. The controller 150 implements a method for managing electrical power on a transport refrigeration unit (TRU) trailer having a conditioned space by disposing an electrical storage device on a containment area suspended from a common frame with a tractor trailer slide rail suspension, as depicted at step 200. The common frame is defined by a pair of elongated parallel rails 20, such that the elongated parallel rails have a spacing based on an alignment with longitudinal frame members supporting an underside of the trailer. The longitudinal frame members of the native trailer are designed for the load within the trailer, and not necessarily for also suspending a large bank of batteries. The controller establishes an electrical connection from a bank of trailer roof mounted solar panels to the electrical storage device for charging the electrical storage device, as disclosed at step 202. Also establishes is an electrical connection from the electrical storage device to a refrigeration compressor on the trailer for cooling an interior of the trailer, as depicted at step 204. The controller generally operates in a sensor driven loop for monitoring a power level in the electrical storage device (step 206) for: switching power from the electrical storage device to the refrigeration compressor, as depicted at step 208, and directing power from the solar panels to the battery, as disclosed at step 210.

Depending on the particular trailer configuration, the controller 150 determines if an e-axle 40 is connected the controller, as shown at step 212. If so, the controller identifies a generated electrical power from the e-axle, as depicted at step 214, and directs, based on an operational priority for maintaining a temperature of the conditioned space inside the trailer, the generated electrical power to the refrigeration compressor or the electrical storage device, as show at step 216. Generally, power is prioritized to protect the trailer cargo at the prescribed refrigeration or freezing temperature.

A further check is performed, at step 218, to determine if a tractor with an electric propulsion drive is connected the controller. If so, the controller identifies available electrical power from at least the trailer roof mounted solar panels and the electrical storage device, as depicted at step 220, and directs, based on an operational priority for maintaining a temperature of the conditioned space inside the trailer, the generated electrical power to the refrigeration compressor or the electric propulsion drive, as shown at step 222.

While the system and methods defined herein have been particularly shown and described with references to embodiments thereof, it will be understood by those skilled in the art that various changes in form and details may be made therein without departing from the scope of the invention encompassed by the appended claims.

What is claimed is:

1. A tractor-trailer vehicle arrangement having a trailer with an articulation coupling at a forward end of the trailer and a plurality of wheels on respective axles at a rearward end, the trailer having longitudinal frame members for engagement with a wheeled suspension, and a slide frame undercarriage device, wherein the slide frame undercarriage device comprises:
   a pair of elongated parallel rails, the elongated parallel rails having a spacing based on an alignment with the longitudinal frame members on an underside of the trailer;

a suspension assembly adapted to receive one or more axle assemblies, each axle assembly having opposed wheels adapted for road transport;

an attachment between the elongated parallel rails and the suspension assembly, the attachment transferring a load from the trailer to the axle assemblies; and a containment area suspended from a forward extension of the elongated parallel rails on a forward side of the suspension assembly, the containment area adapted to receive and support an electrical storage device disposed across a width of the elongated parallel rails and connected to a vehicle-based load.

2. The slide frame undercarriage device of claim 1, wherein the elongated parallel rails are in slidable engagement with the longitudinal frame members, further comprising one or more retractable protrusions on the elongated parallel rails adapted for engagement with a corresponding receptacle of a row of receptacles on the longitudinal frame members.

3. The slide frame undercarriage device of claim 1, further comprising a cooling system in fluidic connection with the electrical energy storage device, the cooling system contained within the containment area and adapted for circulation of a cooling medium for thermal exchange with the electrical storage device.

4. The slide frame undercarriage device of claim 3, wherein the axle assembly includes a generator and a differential for motive generation of electrical energy resulting from rotation of the wheels, further comprising: a fluidic coupling between the cooling system, the electrical storage device and the generator; a pump in fluidic communication with the fluidic coupling for generating a coolant flow in the fluidic coupling; and a heat exchanger for cooling the cooling medium via ambient air exchange.

5. The slide frame undercarriage device of claim 1, wherein the elongated parallel rails extend forward of the axle assembly for suspending the containment area in a volume configured for accommodation of an additional axle assembly.

6. The slide frame undercarriage device of claim 2, further comprising a plurality of axle assembles, each axle assembly of the plurality of axle assemblies attached to a respective suspension assembly, each suspension assembly separate from the suspension assembly of other axle assemblies, a rearward axle assembly independently slidable separate from the others of the plurality of axle assemblies.

7. The slide frame undercarriage device of claim 2, wherein the elongated parallel rails extend rearward to a distal extreme of the trailer for supporting a load at least as much as a rated trailer capacity.

8. The slide frame undercarriage device of claim 4, further comprising: a flexible electrical coupling between the generator and the electrical storage device; a flexible fluidic coupling between the generator and the cooling system; the axle assembly having the generator and differential adapted for slidable rearward movement from the electrical storage device and cooling system.

9. The slide frame undercarriage device of claim 1, wherein the vehicle-based load includes an electrical interface to at least one of a trailer refrigeration apparatus and an electric drive for motive transport of the tractor articulated to the trailer.

10. The slide frame undercarriage device of claim 1, wherein the electrical storage device has an electrical capacity and size greater than a starter battery for an internal combustion (IC) engine for the trailer.

\* \* \* \* \*